United States Patent
Sakai et al.

(10) Patent No.: US 8,584,093 B2
(45) Date of Patent: Nov. 12, 2013

(54) PRE-CONDITION GENERATION DEVICE, POST-CONDITION GENERATION DEVICE, AND METHOD FOR GENERATING THESE CONDITIONS

(75) Inventors: Masahiro Sakai, Kamakura (JP); Takeo Imai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 687 days.

(21) Appl. No.: 12/721,749

(22) Filed: Mar. 11, 2010

(65) Prior Publication Data

US 2010/0235818 A1 Sep. 16, 2010

(30) Foreign Application Priority Data

Mar. 16, 2009 (JP) ................................. 2009-063253

(51) Int. Cl.
*G06F 9/44* (2006.01)
*G06F 11/00* (2006.01)

(52) U.S. Cl.
USPC ........... 717/126; 717/114; 717/124; 717/132; 714/38.1; 714/39

(58) Field of Classification Search
None
See application file for complete search history.

(56) References Cited

U.S. PATENT DOCUMENTS

| | | | | |
|---|---|---|---|---|
| 5,651,111 | A * | 7/1997 | McKeeman et al. | 714/38.1 |
| 6,134,580 | A * | 10/2000 | Tahara et al. | 709/202 |
| 7,120,902 | B2 * | 10/2006 | Flanagan et al. | 717/130 |
| 7,624,256 | B2 * | 11/2009 | Sartorius et al. | 712/226 |
| 7,665,072 | B2 * | 2/2010 | Tillman et al. | 717/132 |
| 8,271,404 | B2 * | 9/2012 | Gulwani et al. | 706/12 |
| 2002/0133806 | A1 * | 9/2002 | Flanagan et al. | 717/123 |
| 2006/0080642 | A1 * | 4/2006 | Ogawa et al. | 717/126 |
| 2006/0150160 | A1 * | 7/2006 | Taft et al. | 717/126 |
| 2009/0064110 | A1 | 3/2009 | Sankaranarayanan et al. | |
| 2009/0113394 | A1 * | 4/2009 | Weber et al. | 717/126 |
| 2009/0326907 | A1 * | 12/2009 | Gulwani et al. | 703/22 |
| 2010/0088548 | A1 * | 4/2010 | Gulwani et al. | 714/38 |
| 2010/0235814 | A1 * | 9/2010 | Ohta et al. | 717/124 |
| 2011/0010587 | A1 * | 1/2011 | Kikuchi | 714/39 |
| 2012/0266133 | A1 * | 10/2012 | Imai et al. | 717/114 |

FOREIGN PATENT DOCUMENTS

JP 2005-182806 7/2005

OTHER PUBLICATIONS

Michael J.C. Gordon, "Mechanizing Programming Logics in Higher Order Logic", [Online], 1989, pp. 1-55, [Retrived from Internet on Jul. 3, 2013], <http://128.232.0.20/~mjcg/Banffpaper.pdf>.*

(Continued)

*Primary Examiner* — Thuy Dao
*Assistant Examiner* — Ziaul A Chowdhury
(74) *Attorney, Agent, or Firm* — Turocy & Watson, LLP (57) ABSTRACT

A device includes: a storage storing second logical expressions; an storage storing an essential condition which indicates a set of one or more second logical expressions selected such that a proposition is not satisfied that the post-condition is satisfied immediately after a program is executed when a logical product of other second logical expressions obtained by excluding the set indicated by the essential condition from the storage is satisfied; a generator generating a candidate condition represented by a logical product of one or more second logical expressions to include a common second logical expression with the set indicated by the essential condition; a judging unit judging whether satisfied is a proposition that the post-condition is satisfied immediately after the program is executed when the candidate condition is satisfied, and an output unit configured to output the candidate condition determined to satisfy the proposition as representing a pre-condition of the program.

10 Claims, 7 Drawing Sheets

(56) References Cited

OTHER PUBLICATIONS

Gary T. Leavens et al., "Preliminary Design of JML: A Behavioral Interface Specification Language for Java", [Online], 2006, pp. 1-38, [Retrived from Internet on Jul. 3, 2013], <http://citeseerx.ist.psu.edu/viewdoc/download?doi=10.1.1.193.479&rep=rep1&type=pdf>.*

Tom Mens, "A Survey of Software Refactoring", [Online], IEEE 2004, pp. 126-139, [Retrived from Internet on Jul. 3, 2013], <http://ieeexplore.ieee.org/stamp/stamp.jsp?tp=&arnumber=1265817>.*

Thomas Kleymann, "Hoare Logic and Auxiliary Variables", [Online], 1999, pp. 541-566, [Retrieved from Internet on Jul. 3, 2013], <http://link.springer.com/content/pdf/10.1007%2Fs001650050057.pdf>.*

* cited by examiner

```
ζ := φ procedure f(n, Z)
    if(n==0)
        COUNTEREXAMPLE TO {∧(S−Z)}⊂{G} IS SEARCHED
        if(COUNTEREXAMPLE IS FOUND)
            ζ := ζ ∪ {Z}
        end if
    else
        for each x∈S
            if(x∉Z)
                f(n−1, Z∪{x})
            end if
        end for
    end if
end procedure f(1, φ)
f(2, φ)
f(3, φ)
```

FIG. 4

```
X := φ loop
  if(P⊆X for some P∈Ψ)
    continue
  end if if(Z∩X=φ for some Z∈ζ)
    continue
  end if SATISFIABLITY OF ∧X IS VERIFIED
  if(∧X CANNOT BE SATISFIED)
    continue
  end if {∧Xi}C{Q} IS VERIFIED
  if(COUNTEREXAPLE CANNOT BE FOUND)
    X IS OUTPUTTED
    if(FURTHER OUTPUT IS REQUIRED)
      Ψ := Ψ ∪ {X}
    else
      PROCESS ENDS
    end if
  end if X := NEXT X IS GENERATED
  PROCESS ENDS IF ALL CANDIDATES ARE GENERATED
end loop
```

PRE-CONDITION GENERATION DEVICE, POST-CONDITION GENERATION DEVICE, AND METHOD FOR GENERATING THESE CONDITIONS

CROSS REFERENCE TO RELATED APPLICATIONS

This application is based upon and claims the benefit of priority from the prior Japanese Patent Application No. 2009-63253, filed on Mar. 16, 2009, the entire contents of which are incorporated herein by reference.

BACKGROUND OF THE INVENTION

1. Field of the Invention

The present invention relates to a pre-condition generation device, a post-condition generation device, and a method for generating a pre-condition and a post-condition of a computer program described by using an imperative programming language.

2. Related Art

As a fundamental method for representing specifications and properties of a program described in an imperative programming language, a set of a pre-condition and a post-condition of the program is widely used. Known as a background theory of the method is an axiomatic semantics, which is a methodology showing the validity of the program by deriving the pre-condition and the post-condition of the program based on an axiom and an inference rule. Hoare's logic is known as a concrete example of the axiomatic semantics.

JP-A 2005-182806 (Kokai) discloses a method for generating a program satisfying specifications described based on the axiomatic semantics, for example.

When performing verification etc. of the program by using the above-mentioned axiomatic semantics, every part of the program is not always given with the pre-condition and the post-condition. In such a case, it is desirable to calculate a weakest pre-condition and a strongest post-condition by using the information before and after each part of the program (the weakest pre-condition and the strongest post-condition are obtained through propagation). For example, when the assignment statement of "x:=x+1;" is given with the post-condition of "x>10," the weakest pre-condition of the assignment statement becomes "x>9." However, it is not always easy to automatically calculate the weakest pre-condition and the strongest post-condition.

This is because, for example, when the program has a loop therein, it is required to automatically derive a loop invariant which is always satisfied before and after the loop is executed, but it is not decidable (in an imperative programming language generally used) (A. Blass and Y. Gurevich. Inadequacy of Computable Loop Invariants. ACM Transactions on Computational Logic. 2 (1): 1-11, January 2001.).

The method for automatically estimating the loop invariant has been studied (for example, N. Suzuki, and K. Ishihata. Implementation of an Array Bound Checker. 4$^{th}$ ACM Symposium on Principles of Programming Languages. Los Angeles, Calif. (January 1977).) However, such a method is not widely used because of the problems in terms of computational complexity and limited applicability.

SUMMARY OF THE INVENTION

According to an aspect of the present invention, there is provided with a pre-condition generation device including a computer readable storage medium containing a set of instructions that causes a computer processor to perform a data processing process, the device comprising:

a program storage configured to store a program described by an imperative programming language;

a post-condition storage configured to store a post-condition of the program, the post-condition being represented by a logical product of one or more first logical expressions;

a logical expression storage configured to store a plurality of second logical expressions;

an essential condition storage configured to store an essential condition which indicates a set of one or more second logical expressions selected from the logical expression storage such that a proposition is not satisfied that the post-condition is satisfied immediately after execution of the program if the program is executed when a logical product of other second logical expressions obtained by excluding the set indicated by the essential condition from all second logical expressions in the logical expression storage is satisfied before the program is executed;

a candidate condition generator configured to generate at least one candidate condition represented by a logical product of one or more second logical expressions selected from the logical expression storage so as to have at least one common second logical expression with the set indicated by the essential condition;

a first judging unit configured to judge whether there is a counterexample to a proposition that the post-condition is satisfied immediately after the program is executed when the candidate condition is satisfied before the program is executed, and to determine that the proposition is satisfied when the counterexample is not existent and that the proposition is not satisfied when the counterexample is existent; and an output unit configured to output the candidate condition determined to satisfy the proposition as representing a pre-condition of the program.

According to an aspect of the present invention, there is provided with a post-condition generation device including a computer readable storage medium containing a set of instructions that causes a computer processor to perform a data processing process, the device comprising:

a program storage configured to store a program described by an imperative programming language;

a pre-condition storage configured to store a pre-condition of the program, the pre-condition being represented by a logical product of one or more first logical expressions;

a logical expression storage configured to store a plurality of second logical expressions;

an essential condition storage configured to store an essential condition which indicates a set of one or more second logical expressions selected from the logical expression storage such that a proposition is not satisfied that a logical product of other second logical expressions obtained by excluding the set indicated by the essential condition from all second logical expressions in the logical expression storage is satisfied immediately after execution of the program if the program is executed when the pre-condition is satisfied before the program is executed;

a candidate condition generator configured to generate at least one candidate condition represented by a logical product of one or more second logical expressions selected from the logical expression storage so as to include at least one common second logical expression with the set indicated by the essential condition;

a first judging unit configured to judge whether there is a counterexample to a proposition that the candidate condition is satisfied after the program is executed when the pre-condition is satisfied immediately before the program is executed, and to determine that the proposition is satisfied when the counterexample is not existent and that the proposition is not satisfied when the counterexample is existent; and an output unit configured to output the candidate condition determined to satisfy the proposition as representing a post-condition of the program.

According to an aspect of the present invention, there is provided with a computer-implemented pre-condition generation method, comprising:

accessing a program storage configured to store a program described by an imperative programming language;

accessing a post-condition storage configured to store a post-condition of the program, the post-condition being represented by a logical product of one or more first logical expressions;

accessing a logical expression storage configured to store a plurality of second logical expressions;

accessing an essential condition storage configured to store an essential condition which indicates is a set of one or more second logical expressions selected from the logical expression storage such that a proposition is not satisfied that the post-condition is satisfied immediately after execution of the program if the program is executed when a logical product of other second logical expressions obtained by excluding the set indicated by the essential condition from all second logical expressions in the logical expression storage is satisfied before the program is executed;

generating a candidate condition represented by a logical product of one or more second logical expressions selected from the logical expression storage so as to include at least one common second logical expression with the set indicated by the essential condition;

judging whether there is a counterexample to a proposition that the post-condition is satisfied immediately after the program is executed when the candidate condition is satisfied before the program is executed, and determining that the proposition is satisfied when the counterexample is not existent and that the proposition is not satisfied when the counterexample is existent; and outputting the candidate condition determined to satisfy the proposition as representing a pre-condition of the program.

According to an aspect of the present invention, there is provided with a computer-implemented post-condition generation method comprising:

accessing a program storage configured to store a program described by an imperative programming language;

accessing a pre-condition storage configured to store a pre-condition of the program, the pre-condition being represented by a logical product of one or more first logical expressions;

accessing a logical expression storage configured to store a plurality of second logical expressions;

accessing an essential condition storage configured to store an essential condition which indicates a set of one or more second logical expressions selected from the logical expression storage such that a proposition is not satisfied that a logical product of other second logical expressions obtained by excluding the set indicated by the essential condition from all second logical expressions in the logical expression storage is satisfied immediately after execution of the program if the program is executed when the pre-condition is satisfied before the program is executed;

generating a candidate condition represented by a logical product of one or more second logical expressions selected from the logical expression storage so as to include at least one common second logical expression with the set indicated by the essential condition;

judging whether there is a counterexample to a proposition that the candidate condition is satisfied after the program is executed when the pre-condition is satisfied immediately before the program is executed, and determining that the proposition is satisfied when the counterexample is not existent and that the proposition is not satisfied when the counterexample is existent; and outputting the candidate condition determined to satisfy the proposition as representing a post-condition of the program.

DETAILED DESCRIPTION OF THE INVENTION

An embodiment according to the present invention will now be explained in detail with reference to the accompanying drawings.

First, the definition of terms and notation will be explained.

(1) In this specification, the logical product of all logical expressions of a finite set S is described as $\hat{\ }S$. When $S=\{A, B, C\}$, $\hat{\ }S$ represents $A\hat{\ }B\hat{\ }C$. When $S=\phi$, $\hat{\ }S$ represents a valid logical expression, namely true. Further, $\hat{\ }\{X_1, X_2, X_3, \ldots, X_n\}$ is described simply as $\hat{\ }X_i$.

(2) Pre-condition and Post-condition

It is assumed that a logical expression Q is always satisfied immediately after a program C is executed when a logical expression P is satisfied before the program C is executed (the program C is not necessarily required to end). At this time, the logical expression P is called a pre-condition of the program C, and the logical expression Q is called a post-condition of the program C. Further, the satisfaction of this relationship (proposition) is described as $\{P\} C \{Q\}$.

(3) Essential condition

It is assumed that the logical expression Q is given. When a subset X of the logical expression set S does not satisfy $\{\hat{\ }(S-X)\} C \{Q\}$, the subset X is called an essential condition.

The element of the subset X is essential since the logical expression Q cannot be satisfied when the element which is not included in the subset X of the logical expression set S is added to the pre-condition. Note that the logical expression Q is not always satisfied even if all elements of the subsets X are added to the pre-condition since the element of subset X is not always a sufficient condition for satisfying the logical expression Q.

(4) In this specification, only a finite set is employed, and thus a subset of the finit set can be effectively expressed by a bit string according to whether each element is included in the subset. For example, when the set of S={a, b, c} is given, the subsets of {a, b, c}, {a, c}, {a}, and φ can be expressed by the bit strings of 111, 101, 100, and 000 respectively. In the device of the present embodiment, the subset is processed while being internally expressed by a bit string.

Figure 1:
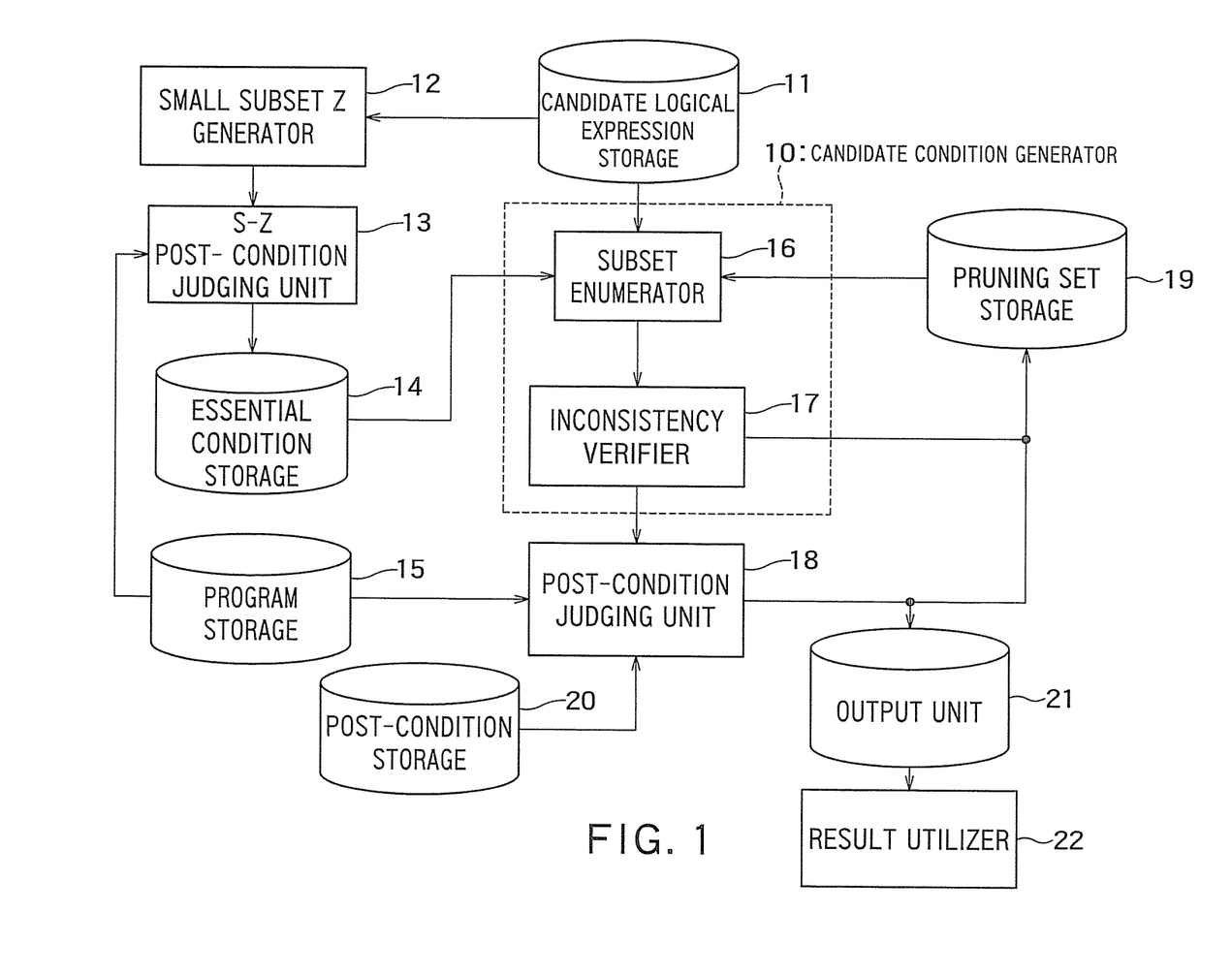
FIG. 1 is a diagram showing the basic structure of a pre-condition generation device according to an embodiment of the present invention.

FIG. 1 is a diagram showing the basic structure of a pre-condition generation device according to an embodiment of the present invention.

This device includes: a candidate logical expression storage (logical expression storage) 11; a small subset Z generator (subset generator) 12; an S-Z post-condition judging unit (second judging unit) 13; an essential condition storage 14; a program storage 15; a subset enumerator 16; an inconsistency verifier 17; a post-condition judging unit (first judging unit) 18; a pruning set storage 19 (pruning condition storage) 19; a post-condition storage 20; an output unit 21; and a result utilizer 22 for using the output of the output unit 21 at a time of an actual verification. A candidate condition generator 10 is formed of the subset enumerator 16 and the inconsistency verifier 17, for example. The pre-condition generation device includes a computer readable storage medium containing a set of instructions that causes a computer processor to perform a data processing process.

The process performed by this device is roughly divided into a preprocess, a main process, and a process using the output. Hereinafter, summary of the preprocess and the main process will be roughly explained and a detailed explanation thereof will be made afterward that by using a concrete example. In the last, a verification process using the output will be explained.

Figure 2:
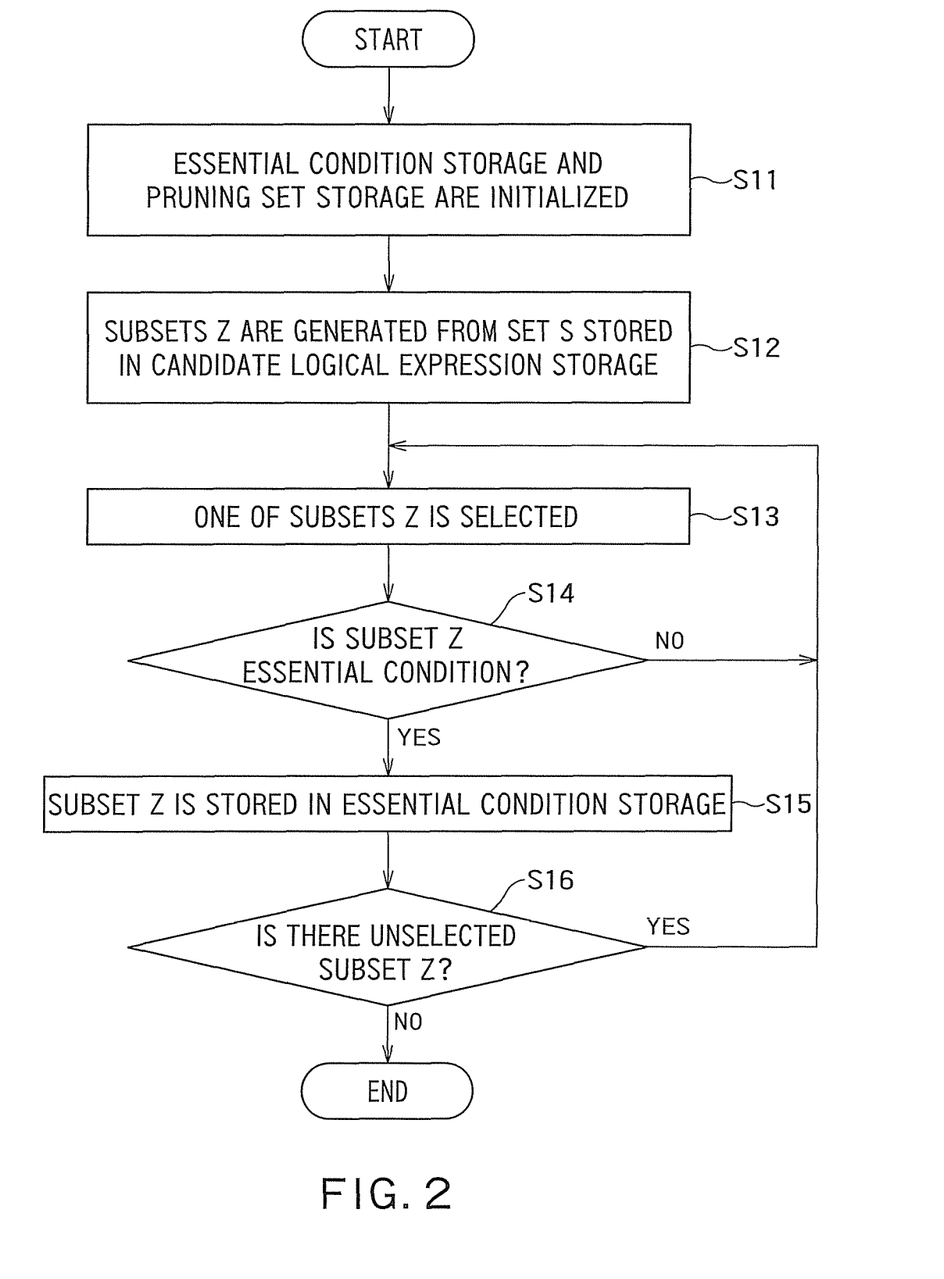
FIG. 2 is a flow chart showing the flow of a preprocess performed by the device of FIG. 1.
Figure 3:
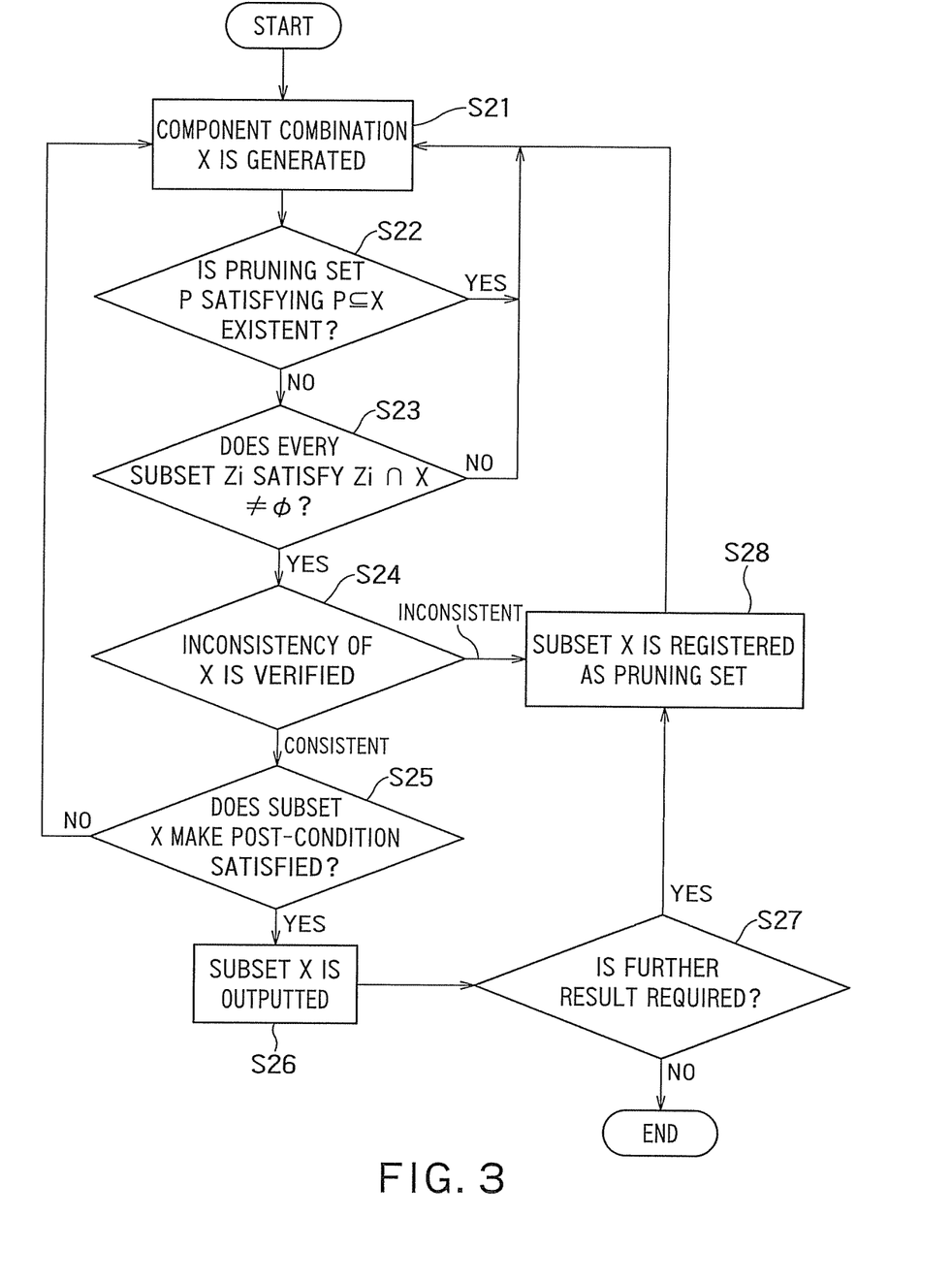
FIG. 3 is a flow chart showing the flow of a main process performed by the device of FIG. 1.

FIG. 2 is a flow chart showing the flow of the preprocess, while FIG. 3 is a flow chart showing the flow of the main process performed after the preprocess.

Before performing the preprocess, a target program is stored in the program storage 15. Furthermore, The post-condition Q represented by a logical product of one or more logical expressions, each of which corresponds to a first logical expression, is stored in the post-condition storage 20. Furthermore, the set S having a finite number of logical expressions, each of which corresponds to a second logical expression, is stored in the candidate logical expression storage 11. The logical expressions (second logical expressions) in the candidate logical expression storage 11 are candidates of components forming the pre-condition finally generated.

As shown in FIG. 2, first, the essential condition storage 14 and the pruning set storage 19 are initialized (Step S11). That is, an essential condition set ζ in the essential condition storage 14 is made to be an empty set φ, and a pruning set ψ in the pruning set storage 19 is made to be an empty set φ. The initialization may be performed by an initialization unit additionally provided to the device of FIG. 1, or by an arbitrary element of FIG. 1 having the functions of the initialization unit.

Next, the small subset Z generator 12 generates a moderate number of subsets $Z_1, Z_2, \ldots \subset S$ from the set S stored in the candidate logical expression storage 11. For example all of the subsets each having a predetermined size or smaller are generated (Step S12).

The S-Z post-condition judging unit 13 sequentially selects each subset $Z_i$ thus generated (Step S13), and verifies whether the logical expression set $Z_i$ is an essential condition (Step S14). More specifically, the S-Z post-condition judging unit 13 checks whether with respect to sets S-$Z_i$ obtained by excluding the subset $Z_i$ from the set S, there exists a counterexample to $\{^{\wedge}(S-Z_i)\} \subset \{Q\}$, and determines that the subset $Z_i$ is an essential condition when the counterexample has found, and that the subset $Z_1$ is not an essential condition when the counterexample has not found (with respect to a detailed process, see the after-mentioned explanation of Step S25 in FIG. 3).

When a counterexample has found (YES), the S-Z post-condition judging unit 13 adds the subset $Z_i$ to the set ζ in the essential condition storage 14 (the set ζ is replaced by ζ∪{$Z_i$}) (Step S15). Whether an unselected subset $Z_i$ is existent is verified (Step S16). When the unselected subset $Z_i$ is existent (YES), the flow returns to Step S13 to select the next $Z_i$, while when every subset $Z_i$ was already selected (NO), the main process ends.

On the other hand, when no counterexample has found in Step S14 (NO), the flow returns to Step S13 to select the next $Z_i$ without taking any action.

Figure 4:
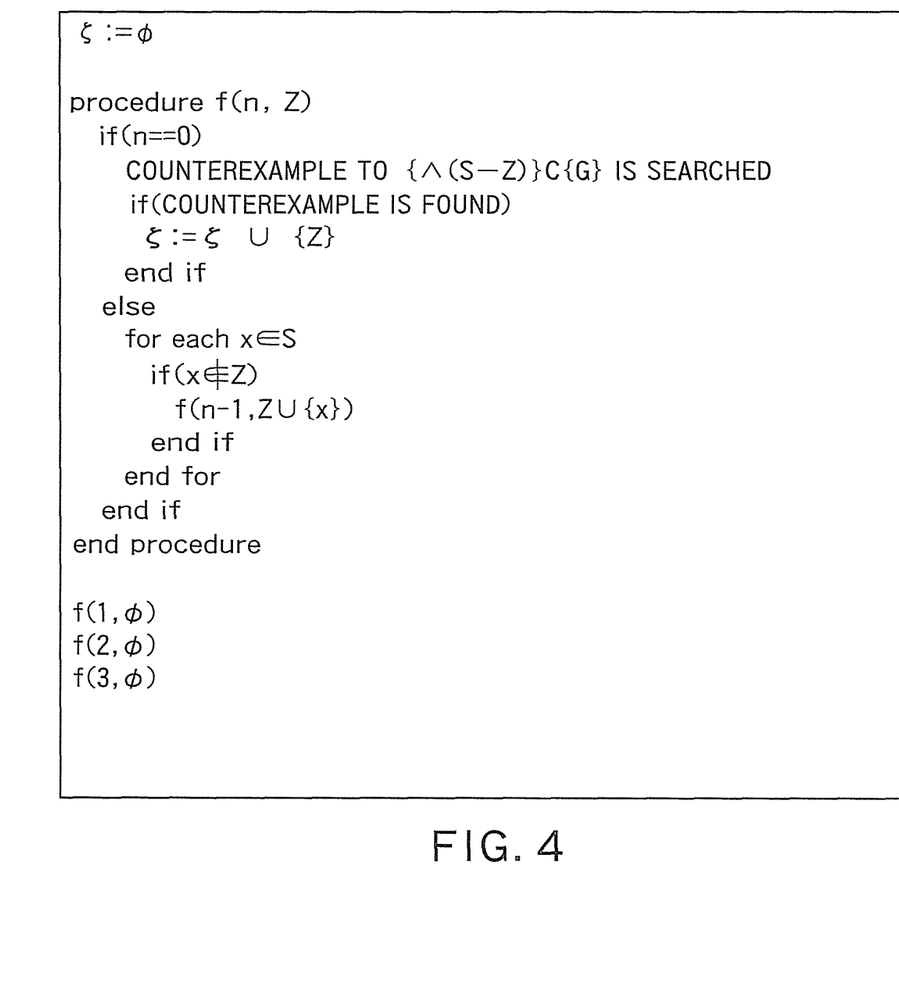
FIG. 4 is a diagram showing an example in which the flow of the preprocess is described using a pseudo code of an imperative language.

FIG. 4 shows an example described using a pseudo code of an imperative language, in which all subsets of $Z_1, Z_2, \ldots$ each having a size of 3 are generated from the whole set S to add the subset having a counterexample to the set ζ in the essential condition storage 14. In this example, first the set ζ is initialized to become the empty set φ, and after that f(1, φ), f(2, φ), and f(3, φ) are sequentially executed. "n" of f(n, Z) represents the size of the subset.

In the way as stated above, the preprocess is completed and the essential condition is stored in the essential condition storage 14. After that, the main process is performed. Hereinafter, the main process will be explained based on the flow chart of FIG. 3.

Figure 5:
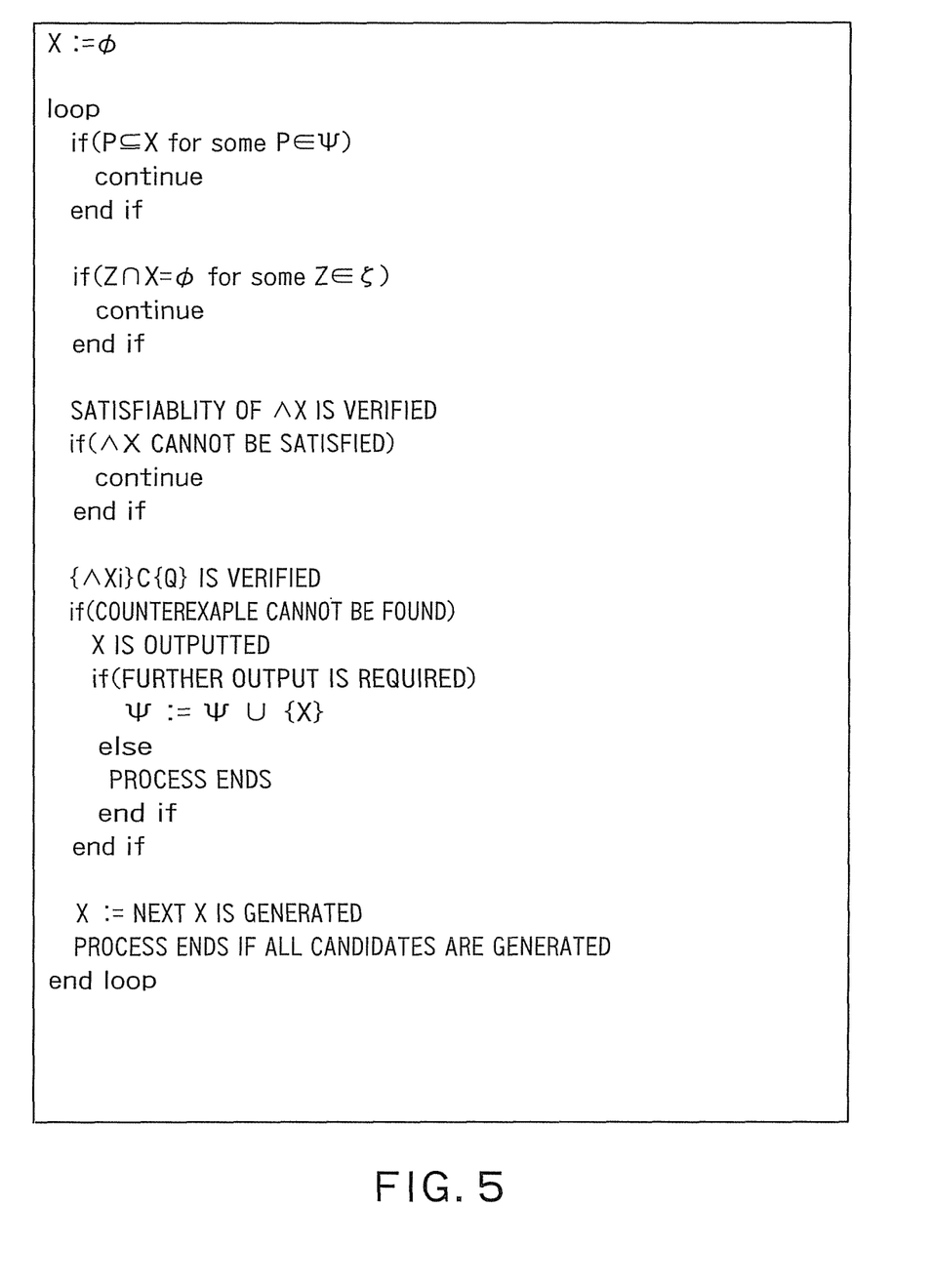
FIG. 5 is a diagram showing an example in which the flow of the main process is described using a pseudo code of an imperative language.

The fundamental flow includes of the steps of: sequentially generating the subsets $X_1, X_2, \ldots \subset S$ of the set S by the subset enumerator 16 in Step S21; sequentially verifying the generated subsets; and outputting a logical product of the subsets permitted by the inconsistency verifier 17 and the post-condition judging unit 18 as a pre-condition. FIG. 5 shows an example in which this flow is described using a pseudo code of an imperative language.

In Step S21, the subset enumerator 16 generates one subset by combining one or more logical expressions (components) in the candidate logical expression storage 11. One subset is generated every time the flow returns to Step S21 through YES branch of the after-mentioned Step S22 or Step S28. In this manner, the subset enumerator 16 sequentially generates the subsets $X_1, X_2, \ldots \subset S$. Note that, when it is judged that there is no more subset to be generated in Step S21, the process of this flow ends. The generated subsets each correspond to a candidate condition of the present invention, and it is said that the subset enumerator 16 generates a candidate condition which is a set of one or more logical expressions selected from the candidate logical expression storage 11. Here, there is a restriction that the subset X is generated earlier than the subset Y when $X \subset Y$ is satisfied. Hereinafter, this order restriction will be explained in detail.

Figure 6:
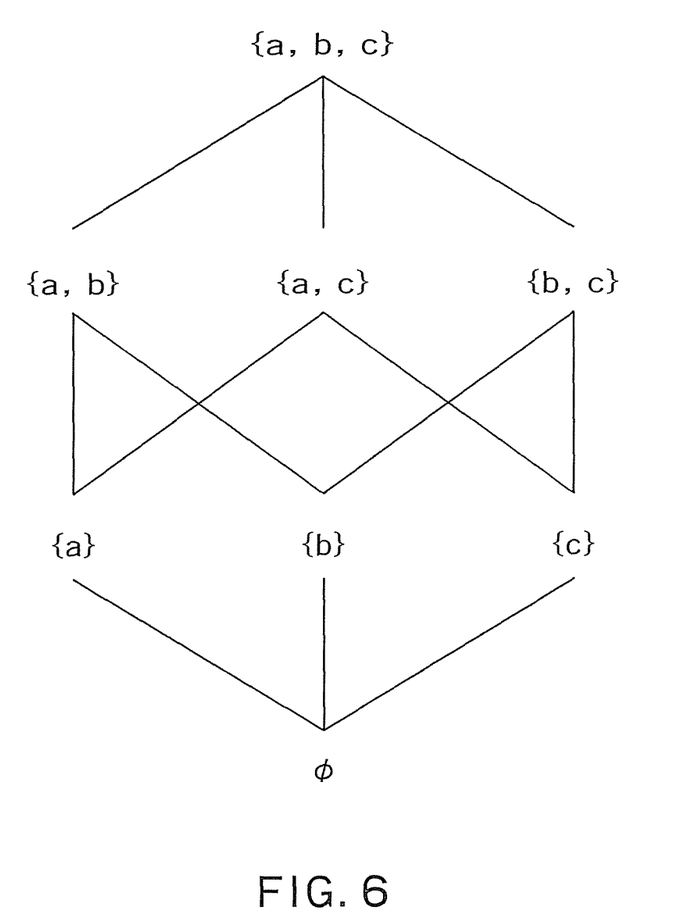
FIG. 6 is a diagram showing an example of a Hasse diagram.

FIG. 6 is a Hasse diagram showing the inclusive relation among the candidate sets when S={a, b, c}. In the Hasse diagram, a side between an upper node Y and a lower node X express $X \subset Y$, and the inclusive relation can be derived except one which is possible to be derived by a reflexive law and a transitive law.

One of the enumeration methods for satisfying the above order restriction is to enumerate the candidate sets through a breadth-first search from the bottom side of this Hasse diagram. In this case, the candidate sets are enumerated in the order of φ, {a}, {b}, {c}, {a, b}, {a, c}, {b, c}, and {a, b, c}.

Further, as far as the above order restriction is satisfied, a different order may be employed. As an example, the candidate sets may be enumerated in the order of $\phi$, $\{a\}$, $\{b\}$, $\{a, b\}$, $\{c\}$, $\{a, c\}$, $\{b, c\}$, and $\{a, b, c\}$.

In Step S22, the subset enumerator 16 verifies whether the subset (combination) generated in Step S21 includes a pruning set in the pruning set storage 19. More specifically, whether the subset includes a pruning set is verified.

That is, whether P satisfying $P \subset X$ is existent with respect to the subset $X \subset S$ generated in Step S21 is verified. Here, P represents a pruning set, and $P \in \psi$ when $\psi$ represents all pruning sets in the pruning set storage 19. When such a pruning set P is existent (YES), the subset X is canceled, and the flow returns to Step S21 to generate the next candidate (subset) in the order satisfying the aforementioned order restriction. When such a pruning set P is not existent (NO), the flow proceeds to the next Step S23.

Here, the pruning set P is a set having an inconsistency between the logical expressions included in the pruning set P. That is, the pruning set P is a set having an inconsistent logical product of the logical expressions included in the pruning set P (a set judged to be inconsistent in the after-mentioned Step S24), or a set which was already outputted (a set outputted in the after-mentioned Step S26). In Step S22, the subset including such a pruning set P is excluded. The reason why the subset including a set including the logical expressions inconsistent with each other is removed is that it is meaningless to handle such a subset as a pre-condition since the subset is inconsistent in itself and there is no execution state of the program which satisfies the subset. On the other hand, the reason why the subset including a set which was already outputted is removed is that it is meaningless to output the subset which is not a smallest set satisfying the condition.

In Step S23, the subset enumerator 16 verifies whether the subset X judged not to include the pruning set P in Step S22 includes each element Z of the essential condition set (whether the subset X includes a logical expression included in each subset Z is verified). That is, whether the subset X includes the subset Z is verified with respect to each subset $Z \in \zeta$. When a subset X not including the subset $Z \in \zeta$ is existent (NO), such a subset X is canceled, and the flow returns to Step S21 to generate the next candidate (subset). When the subset X has an element in common with every subset $Z \in \zeta$ (YES), the flow proceed to the next Step S24. By doing so, the candidate (component set X) lacking even one element of the essential condition set is excluded in this step, by which computational complexity can be lowered in the subsequent steps. Although there is a strong possibility that such a candidate will be finally canceled in the following Step S25, the candidate is canceled previously in this step in order to lower the computational complexity. In this case, it is required that the subset X has an element in common with every subset Z. However, it is also possible to change the process by employing a condition that the subset X has an element in common with at least one subset Z to let the flow proceed to Step S24.

In Step S24, the inconsistency verifier 17 verifies whether the logical expressions included in the subset (combination) X are inconsistent with each other (that is, whether the logical product of the subset X serving as the candidate condition is inconsistent is verified). When an inconsistency is found, the subset is registered as a pruning set (the candidate condition is registered as a pruning condition) and the flow proceeds to Step S28. When no inconsistency is found, the flow proceeds to the next Step S25. The inconsistency can be found by searching a state satisfying $\hat{}X$, and an SAT solver etc. can be used for that purpose. In this manner, by excluding the inconsistent pre-condition in this step, a pre-condition including an inconsistency is not outputted. But, when a pre-condition including an inconsistency is permitted to be outputted, there is no problem even if a verification method which is not always capable of detecting an inconsistency is used.

In Step S25, the post-condition judging unit 18 verifies whether a proposition is satisfied, the proposition being that the logical product of the post-condition in the post-condition storage 20 is satisfied immediately after the program in the program storage 15 is executed when the logical product of the subset X is satisfied. In more detail, whether the proposition $\{\hat{}X\} C \{Q\}$ is satisfied is verified by searching a counterexample to the proposition $\{\hat{}X\} C \{Q\}$. The counterexample to the proposition $\{\hat{}X\} C \{Q\}$ is found by searching an example where the pre-position $\hat{}X$ is satisfied before the program C is executed and the logical expression Q is not satisfied after the program C is executed. When such an execution example is existent, the proposition $\{\hat{}X\} C \{Q\}$ is not satisfied.

As an example for performing such a search, the method disclosed by Daniel Jackson et al. of Massachusetts Institute of Technology in the United States can be used (Greg Dennis, Felix Sheng-Ho Chang, and Daniel Jackson. Modular verification of code with sat. In ISSTA '06: Proceedings of the 2006 international symposium on Software testing and analysis, pp. 109.120, New York, N.Y., USA, 2006. ACM.). Further, Forge developed by the same group can be used (http://sdg.csail.mit.edu/forge/) as a tool for realizing this method. Furthermore, a technique used in model checking can also be used as another method. However, these methods will not be further explained since the present invention is not focused on the details of these methods.

When a counterexample to the proposition $\{\hat{}X\} C \{Q\}$ is found (NO), the post-condition judging unit 18 cancels the subset X, and the flow returns to Step S21. When no counterexample is found, that is, when the subset X satisfies the proposition $\{\hat{}X\} C \{Q\}$ (YES), the flow proceeds to the next Step S26.

In Step S26, the output unit 21 outputs the subset X judged to satisfy the post-condition in Step S25 (that is, a candidate condition formed of the logical product of the subset X is outputted as a pre-condition).

In Step S27, the post-condition judging unit 18 judges whether a further result (output) is required. For example, when the output is directly used by a human user, the user can judge whether a predetermined number of subsets (that is, a predetermined number of pre-conditions) are outputted or whether the process should be continued.

When a further result (output) is not required (NO), the main process ends at this point. When a further result (output) is required, the flow returns to Step S28 for adding the subset X to the pruning set. The reason why the subset X is registered as the pruning set at Step S28 is to previously exclude a redundant candidate (as including the subset X as a subset) which will be possibly generated in the following steps.

In Step S28, the subset X judged to be inconsistent in Step S24 and the subset X judged to satisfy the post-condition in Step S25 are added to the pruning set ($\psi$ is replaced by $\psi \cup \{X\}$). After performing Step S28, the flow returns to Step S21 to generate the next candidate X.

When an inconsistent candidate (subset) X is found by the inconsistency verification in the above Step S24, it is also possible to examine which subset Y of the subset X is inconsistent in order to register the subset Y as a pruning set instead of the subset X itself. As stated above, by registering a smaller subset, pruning can be performed in the earlier stage and the improvement in performance is expected. Note that since some theorem provers for performing disproof can extract inconsistent subsets, such a theorem prover can be used in the inconsistency verification.

In the process flow of FIG. 3, whether the subset includes the essential condition is judged after the subset enumerator 16 generates the subset and the subset which does not include the essential condition is canceled. However, it is also possible to generate the subset including the essential condition from the beginning without judging whether the subset includes the essential condition. There is no problem whichever the method is employed since the subset including the essential condition is transferred to the inconsistency verifier 17 in each case.

Hereinafter, an example for performing the processing according to the present embodiment on the following program example described in an imperative language will be explained.

```
if x < 0 then
    y := −x
else
    y := x
end if
```

Program Example

This program calculates the absolute value of a variable x and stores it in a variable y. Hereinafter, this program is expressed with the reference numeral C. This program is stored in the program storage 15.

Further, y≤5 is stored in the post-condition storage 20 as a post-condition, and the following four logical expressions are stored in the candidate logical expression storage 11 as candidate components of the pre-condition.

a: x≤5
b: x≤10
c: 10≤x
d: −5≤x

First, an essential condition is registered by performing the preprocess as stated below.

The essential condition storage 14 and the pruning set storage 19 are initialized (Step S11 in FIG. 1), and the small subset Z generator 12 generates subsets Z (Step S12). Here, the number of elements in the subset Z is one or smaller for simple explanation. That is, the small subset Z generator 12 generates five subsets Z, namely ϕ, {a}, {b}, {c}, and {d} (Step S12).

After that, the S-Z post-condition judging unit 13 selects the subset Z=ϕ first (Step S13), which shows that ^(S−Z)=^{a, b, c, d}=a^b^c^d, and verifies whether a counterexample to the proposition {a^b^c^d} C {y≤5} is existent. Here, the element "a" showing x≤5 and the element "c" showing 10≤x are inconsistent with each other, which shows that the pre-condition a^b^c^d cannot be satisfied. Therefore, there is no case where the pre-condition a^b^c^d is satisfied before the program C is executed and the post-condition y≤5 is not satisfied after the program C is executed. Accordingly, no counterexample is found. Therefore, the subset Z=ϕ is not an essential condition (NO branch of Step S14), and is not registered in the essential condition storage 14.

Next, the subset Z={a} is selected (Step S13), and whether a counterexample to the proposition {b^c^d} C {y≤5} is existent is verified. When x=10, b^c^d is satisfied, and y=10 after the program C is executed, which shows that the post-condition cannot be satisfied. Therefore, the case where x=10 before the program C is executed and y=10 after the program C is executed is found as a counterexample. Since the counterexample is found, the subset {a} is judged to be an essential condition (YES branch of Step S14), and is registered as an essential condition (Step S15). That is, the subset Z={a} is registered in the essential condition storage 14.

Next, the subset Z={b} is selected (Step S13), and whether a counterexample to the proposition {a^c^d} C {y≤5} is existent is verified. In this case, as in the case of the subset Z=ϕ, the pre-condition a^c^d cannot be satisfied, and thus no counterexample is found. Therefore, the subset Z={b} is not an essential condition (NO branch of Step S14), and is not registered in the essential condition storage 14.

Next, the subset Z={c} is selected (Step S13), and whether a counterexample to the proposition {a^b^d} C {y≤5} is verified. The pre-condition a^b^d is satisfied when −5≤x≤5. In this case, is inevitably satisfied after the program C is executed, and thus no counterexample is found. Therefore, the subset Z={c} is not an essential condition (NO branch of Step S14), and is not stored in the essential condition storage 14.

Next, the subset Z={d} is selected (Step S13), and whether a counterexample to the proposition {a^b^c} C {y≤5} is existent is verified. In this case, as in the case of the subset Z=ϕ, the pre-condition a^b^d cannot be satisfied, and thus no counterexample is found. Therefore, the subset Z={d} is not an essential condition (NO branch of Step S14), and is not registered in the essential condition storage 14.

As stated above, every subset Z is selected (NO branch of Step S16), and the preprocess ends. As a result of the preprocess, the essential condition set becomes {{a}}, which is stored in the essential condition storage 14.

Next, the main process is performed.

First, it is required for the subset enumerator 16 to determine the enumeration order (generation order) of the subsets. Here, candidates (subsets) are generated in the order of ϕ, {a}, {b}, {a, b}, {c}, {a, c}, {b, c}, {a, b, c}, {d}, {a, d}, {b, d}, {a, b, d}, {c, d}, {a, c, d}, {b, c, d}, and {a, b, d} (Step S21 in FIG. 2). Hereinafter, the result obtained by the process sequentially performed on each candidate will be explained.

First, the empty set ϕ is canceled since it has no element in common with the essential condition {a} (NO branch of Step S23 in FIG. 3).

The subset {a} has every element in common with the essential condition (YES branch of Step S23), and includes no inconsistency (Consistent branch in Step S24). However, the subset {a} is canceled since a counterexample to the proposition {a} C {y≤5} exists when x=−6, which shows that the check for the post-condition is unsuccessful (NO branch of Step S25).

The subset {b} is canceled since it has no element in common with the essential condition {a} (NO branch of Step S23).

The subset {a, b} has every element in common with the essential condition (YES branch of Step S23). However, the subset {a, b} is canceled since a counterexample to the proposition {a^b} C {y≤5} exists when x=−6, which shows that the check for the post-condition is unsuccessful (NO branch of Step S25).

The subset {c} is canceled since it has no element in common with the essential condition {a} (NO branch of Step S23).

The subset {a, c} has every element in common with the essential condition (YES branch of Step S23). However, since the element "a" showing x≤5 and the element "c" showing 10≤x are inconsistent with each other (Inconsistent branch of Step S24), the subset {a, c} is registered as a pruning set (Step S28).

The subset {b, c} is canceled since it has no element in common with the essential condition {a} (NO branch of Step S23).

The subset {a, b, c} is canceled since it includes the pruning set {a, c} (YES branch of Step S22).

The subset {d} is canceled since it has no element in common with the essential condition {a} (NO branch of Step S23).

The subset {a, d} does not include the pruning set (NO branch of Step S22), has every element in common with the essential condition (YES branch of Step S23), includes no inconsistency (Consistent branch of Step S24), and has no counterexample to the proposition {a^d} C {y≤5} (YES branch of Step S25). Accordingly, the subset {a, d}, namely {x≤5, −5≤x} is output as a pre-condition (Step S26). whether a further result is required is judged (Step S27), and the process ends when it is judged that no further result is required (NO). When it is judged a further result is required (YES), the subset {a, d} is registered as a pruning set (Step S28), and the next candidate is generated (Step S21).

The subset {b, d} is canceled since it has no element in common with the essential condition {a} (NO branch of Step S23).

The subset {a, b, d} is canceled since it includes the pruning set {a, d} (YES branch of Step S22).

The subset {c, d} is canceled since it has no element in common with the essential condition {a} (NO branch of Step S23).

The subset {a, c, d} is canceled since it includes the pruning set {a, c} or {a, d} (YES branch of Step S22).

The subset {b, c, d} is canceled since it has no element in common with the essential condition {a} (NO branch of Step S23).

The subset {a, b, c, d} is canceled since it includes the pruning set {a, c} or {a, d} (YES branch of Step S22).

After performing the above steps, the main process ends.

In the above explanation, the post-condition is previously stored in the post-condition storage 20, while the components (logical expressions) of the pre-condition are previously stored in the candidate logical expression storage 11. However, it is also possible to add a function (analysis processor) for automatically generating the components (logical expressions) of the pre-condition and the post-condition to the device of FIG. 1. This function can be realized by using, for example Daikon developed by the study group of M. Ernst of Massachusetts Institute of Technology ("The Daikon system for dynamic detection of likely invariants" by Michael D. Ernst, Jeff H. Perkins, Philip J. Guo, Stephen McCamant, Carlos Pacheco, Matthew S. Tschantz, and Chen Xiao. Science of Computer Programming, vol. 69, no. 1-3, December 2007, pp. 35-45.).

Daikon has a function to record a log showing the transition of a variable in an executed program. By analyzing the log using a technique of machine learning, it is possible to extract conditions (invariants) which are conditional restrictions at entrance or exit of a subroutine.

Accordingly, by using Daikon, a second program including a certain subroutine (program) is executed to acquire candidates (invariants) which are conditional restrictions before and after the execution of the certain subroutine (program). Then, based on the results obtained by Daikon, an invariant which is a conditional restriction after the execution of the subroutine is stored in the post-condition storage 20 as a post-condition, while the condition before the execution of the subroutine is stored in the candidate logical expression storage 11 as the components (logical expressions) of the pre-condition. After that, the preprocess and the main process are performed as stated above.

In the device of FIG. 1, although the small subset Z generator 12 and the subset enumerator 16 are devices separated from each other, the function in common between these devices can be performed by using a common module.

Similarly, although the S-Z post-condition judging unit 13 and the post-condition judging unit 18 are devices separated from each other, the function in common between these devices can be performed by using a common module.

Next, the verification process performed by the result utilizer 22 will be explained. An example will be explained to show how to use the obtained pre-condition and post-condition in various verifications of the program.

As an example, it is possible to verify another program D calling the program C as a subroutine, in which pre-condition and post-condition of the program C are obtained according the present embodiment in advance.

There are program verification techniques in which the program D can be verified without referring to the substance of the program C by assuming that the program C satisfies given specifications (pre-condition and post-condition) (Forge stated above is one of these techniques). There is an advantage that such a verification technique can be easily applied to a large-scale program since the verification based on this technique is not performed on the whole program at one time but on each small component as a unit.

Accordingly, when verifying the program D by using such a verification technique, the pre-condition and post-condition obtained by the present embodiment are used as the specifications of the program C so that the program D can be verified without referring to the substance of the program C even if complete specifications are not provided for the program D.

Figure 7:
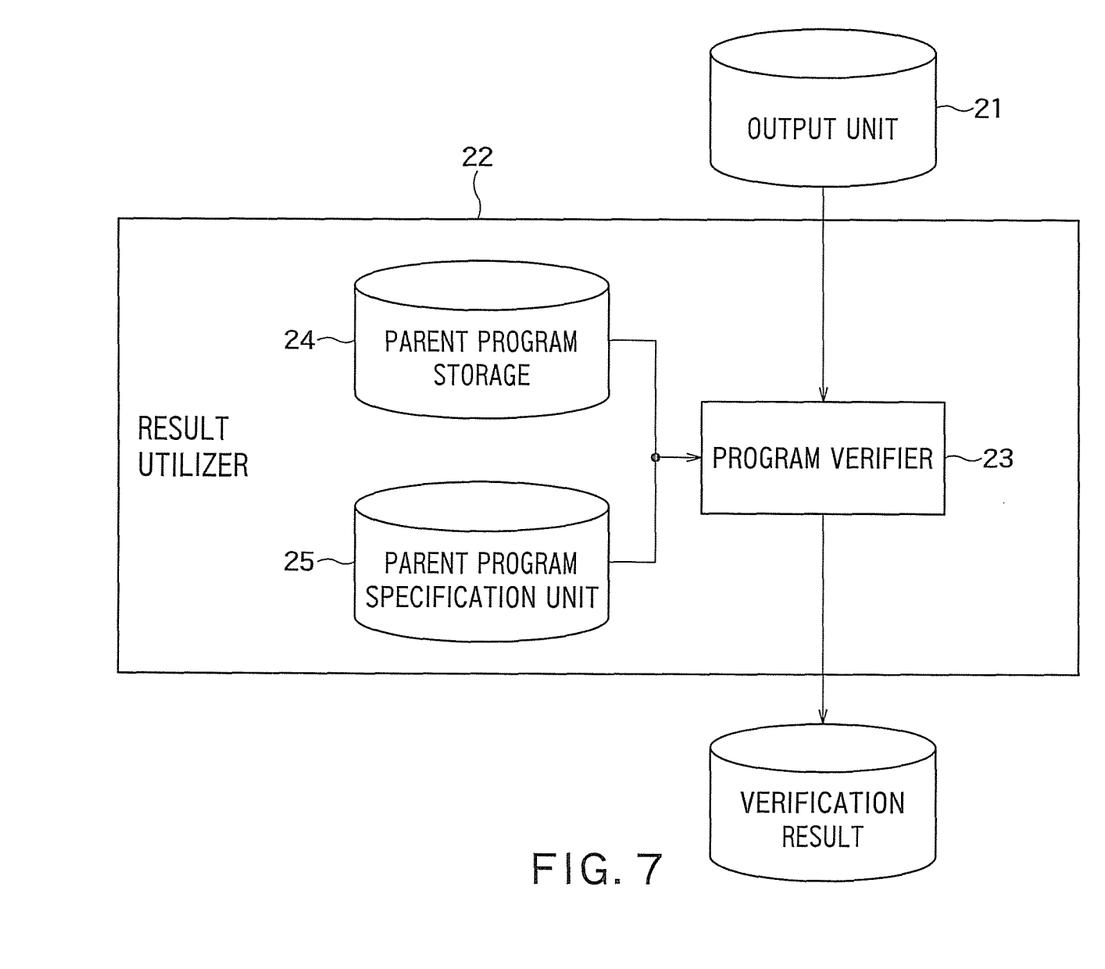
FIG. 7 is a diagram showing the detailed structure of a result utilizer.

FIG. 7 shows the structure of the result utilizer 22 in this example in more detail. Here, the program D is stored in a parent program storage 24, and specifications (pre-condition and post-condition) of the program D are stored in a parent program specification storage unit 25. A program verifier 23 verifies whether the program D stored in the parent program storage 24 satisfies the specifications stored in the parent program specification storage unit 25 by using the method as shown in Step S24. Note that, in this case, the verification is performed based on the assumption that the program C called in the program D satisfies the conditions given by the output unit 21 without referring to the substance of the program C. Specifically, the program verifier 23 judges whether a proposition is satisfied by verifying whether a counterexample to the proposition is existent, the proposition showing that the post-condition of the program D is satisfied immediately after the program D is executed when the pre-condition of the program D (third program) is satisfied. At this time, the program verifier 23 performs the verification based on the assumption that the program C (subroutine) included in the program D satisfies the pre-condition outputted from the output unit 21 and the post-condition in the post-condition storage 20. In this way, the verification can be effectively performed in a short time.

As another example of the verification performed by the result utilizer 22, a human user may check and judge whether the original specifications (described in a natural language) of the program are disagreed with the obtained pre-condition and post-condition. Then, when it is judged that there is a disagreement, at least one of the specifications and the program has a problem and thus one or both of the specifications and the program should be corrected.

Generally, the program describes procedures, while the specifications describe properties to be satisfied. It is difficult to judge whether a disagreement is existent between the program and the specifications, since those are described in quite different ways. However, the present method makes it possible to easily judge the existence of a disagreement by generating based on the program the pre- and post-conditions which are declarative conditional description and comparing the pre- and post-conditions with the specifications.

As stated above, according to the present embodiment, when the post-condition of the program is previously given, the pre-condition of the program can be effectively and approximately found by combining the logical expressions previously given. Generally, it is not possible to automatically calculate the weakest pre-condition due to the existence of a loop etc. However, in the present embodiment, when a set of logical expressions serving as candidate components of the pre-condition and the post-condition are previously given, an approximate pre-condition can be effectively found by searching a combination of the logical expressions which have no inconsistency therebetween and satisfy the post-condition.

The present embodiment as stated above can be applied to a post-condition generation device for approximately effectively finding the post-condition satisfying the pre-condition by combining the logical expressions when the pre-condition and candidate components (logical expressions) of the post-condition are previously given. The process in this case can be realized by alternating the "post-condition" with the "pre-condition" as needed in the explanation stated thus far. The approximate post-condition found in this way becomes a non-strongest post-condition (condition comprehended in the strongest post-condition).

What is claimed is:

1. A computer-implemented pre-condition generation method, comprising:
   accessing a program storage configured to store a program described by an imperative programming language;
   accessing a post-condition storage configured to store a post-condition of the program, the post-condition being a logical product of one or more first logical expressions;
   accessing a logical expression storage configured to store a plurality of second logical expressions;
   accessing an essential condition storage configured to store an essential condition which is a set of one or more second logical expressions selected from the logical expression storage such that a proposition is not satisfied that the post-condition is satisfied immediately after execution of the program when a logical product of other second logical expressions obtained by excluding the essential condition from all second logical expressions in the logical expression storage is satisfied before execution of the program;
   generating a candidate condition being a logical product of one or more second logical expressions selected from the logical expression storage so as to include at least one common second logical expression with the essential condition;
   judging whether there is a counterexample to a proposition that the post-condition is satisfied immediately after execution of the program when the candidate condition is satisfied before execution of the program, and determining that the proposition is satisfied when the counterexample is not existent and that the proposition is not satisfied when the counterexample is existent; and
   outputting the candidate condition satisfying the proposition as a pre-condition of the program.

2. A computer-implemented post-condition generation method comprising:
   accessing a program storage configured to store a program described by an imperative programming language;
   accessing a pre-condition storage configured to store a pre-condition of the program, the pre-condition being a logical product of one or more first logical expressions;
   accessing a logical expression storage configured to store a plurality of second logical expressions;
   accessing an essential condition storage configured to store an essential condition which is a set of one or more second logical expressions selected from the logical expression storage such that a proposition is not satisfied that a logical product of other second logical expressions obtained by excluding the essential condition from all second logical expressions in the logical expression storage is satisfied immediately after execution of the program when the pre-condition is satisfied before execution of the program;
   generating a candidate condition being a logical product of one or more second logical expressions selected from the logical expression storage so as to include at least one common second logical expression with the essential condition;
   judging whether there is a counterexample to a proposition that the candidate condition is satisfied after execution of the program when the pre-condition is satisfied immediately before execution of the program, and determining that the proposition is satisfied when the counterexample is not existent and that the proposition is not satisfied when the counterexample is existent; and
   outputting the candidate condition satisfying the proposition as a post-condition of the program.

3. A pre-condition generation device including a non-transitory computer readable storage medium containing a set of instructions, comprising:
   a program storage configured to store a program described by an imperative programming language;
   a post-condition storage configured to store a post-condition of the program, the post-condition being a logical product of one or more first logical expressions;
   a logical expression storage configured to store a plurality of second logical expressions;
   an essential condition storage configured to store an essential condition which is a set of one or more second logical expressions selected from the logical expression storage such that a proposition is not satisfied that the post-condition is satisfied immediately after execution of the program when a logical product of other second logical expressions obtained by excluding the essential condition from all second logical expressions in the logical expression storage is satisfied before execution of the program;
   a candidate condition generator configured to generate at least one candidate condition being a logical product of one or more second logical expressions selected from the logical expression storage so as to have at least one common second logical expression with the essential condition;
   a first judging unit configured to judge whether there is a counterexample to a proposition that the post-condition is satisfied immediately after execution of the program when the candidate condition is satisfied before execution of the program, and to determine that the proposition is satisfied when the counterexample is not existent and that the proposition is not satisfied when the counterexample is existent; and an output unit configured to output the candidate condition satisfying the proposition as a pre-condition of the program.

4. The device according to claim 3, further comprising:
a subset generator configured to generate a subset Z by combining one or plurality of the second logical expressions in the logical expression storage; and
a second judging unit configured to judge whether there is a counterexample to a proposition that the post-condition is satisfied immediately after execution of the program when a logical product of elements of subset S-Z obtained by excluding the subset Z from a set S of all second logical expressions in the logical expression storage is satisfied before execution of the program, and to determine that the proposition is satisfied when the counterexample is not existent and that the proposition is not satisfied when the counterexample is existent;
wherein the essential condition storage stores the subset Z not satisfying the proposition as the essential condition.

5. The device according to claim 3, further comprising an analysis processor configured to:
execute a second program including the program, the second program having a variable, and record a log showing transition of a value of the variable,
generate an invariant of the variable satisfied immediately before execution of the program based on the log and store the invariant in the logical expression storage as a second logical expression, and
generate an invariant of the variable satisfied immediately after execution of the program based on the log and store the invariant in the post-condition storage as representing the post-condition.

6. The device according to claim 3, further comprising:
a parent program storage configured to store a third program including the program;
a parent program specification storage configured to store a pre-condition and a post-condition of the third program; and
a program verifier configured to verify whether there is a counterexample to a proposition that the post-condition of the third program is satisfied immediately after execution of the third program when the pre-condition of the third program is satisfied before execution of the third program, and to determine that the proposition is satisfied when the counterexample is not existent and that the proposition is not satisfied when the counterexample is existent,
wherein the program verifier performs verification based on an assumption that the program included in the third program satisfies the pre-condition output by the output unit and the post-condition in the post-condition storage.

7. A post-condition generation device including a non-transitory computer readable storage medium containing a set of instructions, comprising:
a program storage configured to store a program described by an imperative programming language;
a pre-condition storage configured to store a pre-condition of the program, the pre-condition being a logical product of one or more first logical expressions;
a logical expression storage configured to store a plurality of second logical expressions;
an essential condition storage configured to store an essential condition which is a set of one or more second logical expressions selected from the logical expression storage such that a proposition is not satisfied that a logical product of other second logical expressions obtained by excluding the essential condition from all second logical expressions in the logical expression storage is satisfied immediately after execution of the program when the pre-condition is satisfied before execution of the program;
a candidate condition generator configured to generate at least one candidate condition being a logical product of one or more second logical expressions selected from the logical expression storage so as to include at least one common second logical expression with the essential condition;
a first judging unit configured to judge whether there is a counterexample to a proposition that the candidate condition is satisfied after execution of the program when the pre-condition is satisfied immediately before execution of the program, and to determine that the proposition is satisfied when the counterexample is not existent and that the proposition is not satisfied when the counterexample is existent; and
an output unit configured to output the candidate condition satisfying the proposition as a post-condition of the program.

8. The device according to claim 7, further comprising:
a subset generator configured to generate a subset Z by combining one or plurality of the second logical expressions in the logical expression storage; and
a second judging unit configured to judge whether there is a counterexample to a proposition that a logical product of elements of subset S-Z obtained by excluding the subset Z from a set S of all second logical expressions in the logical expression storage is satisfied after execution of the program when the pre-condition is satisfied immediately before execution of the program, and to determine that the proposition is satisfied when the counterexample is not existent and that the proposition is not satisfied when the counterexample is existent;
wherein the essential condition storage stores the subset Z not satisfying the proposition as the essential condition.

9. The device according to claim 7, further comprising an analysis processor configured to:
execute a second program including the program, the second program having a variable, and record a log showing transition of a value of the variable,
generate an invariant of the variable satisfied immediately before execution of the program based on the log and store the invariant in the pre-condition storage as representing the pre-condition, and
generate an invariant of the variable satisfied immediately after execution of the program based on the log and store the invariant in the logical expression storage as a second logical expression.

10. The device according to claim 7, further comprising:
a parent program storage configured to store a third program partially including the program;
a parent program specification storage configured to store a pre-condition and a post-condition of the third program; and
a program verifier configured to verify whether there is a counterexample to a proposition that the post-condition of the third program is satisfied immediately after execution of the third program when the pre-condition of the third program is satisfied before execution of the third program, and to determine that the proposition is satisfied when the counterexample is not existent and that the proposition is not satisfied when the counterexample is existent,
wherein the program verifier performs verification based on an assumption that the program included in the third program satisfies the pre-condition in the pre-condition storage and the post-condition output by the output unit.

\* \* \* \* \*